US009306987B2

(12) United States Patent
Olsen et al.

(10) Patent No.: US 9,306,987 B2
(45) Date of Patent: Apr. 5, 2016

(54) CONTENT MESSAGE FOR VIDEO CONFERENCING

(71) Applicant: Cisco Technology, Inc., San Jose, CA (US)

(72) Inventors: Jorgen Olsen, Oslo (NO); Greg Hakonsen, Sokna (NO)

(73) Assignee: Cisco Technology, Inc., San Jose, CA (US)

( * ) Notice: Subject to any disclaimer, the term of this patent is extended or adjusted under 35 U.S.C. 154(b) by 36 days.

(21) Appl. No.: 14/264,608

(22) Filed: Apr. 29, 2014

(65) Prior Publication Data

US 2015/0312294 A1    Oct. 29, 2015

(51) Int. Cl.
*H04L 29/06* (2006.01)
*H04N 7/15* (2006.01)
*H04N 7/14* (2006.01)
*H04N 21/6336* (2011.01)
*H04N 21/845* (2011.01)
*H04N 19/70* (2014.01)
*H04N 19/46* (2014.01)

(52) U.S. Cl.
CPC .......... *H04L 65/4023* (2013.01); *H04L 65/602* (2013.01); *H04L 65/607* (2013.01); *H04L 65/80* (2013.01); *H04N 7/147* (2013.01); *H04N 7/15* (2013.01); *H04N 19/46* (2014.11); *H04N 19/70* (2014.11); *H04N 21/6336* (2013.01); *H04N 21/8451* (2013.01)

(58) Field of Classification Search
CPC ..... H04N 7/15; H04N 19/44; H04N 21/8451; H04N 21/23406; H04N 19/597
USPC .................. 348/14.01–14.16, 473, 461, 576; 375/240.14, 240.16, 240.25, 240.01, 375/240.12
See application file for complete search history.

(56) References Cited

U.S. PATENT DOCUMENTS

| 6,366,959 | B1 | 4/2002 | Sidhu et al. |
| 2005/0114887 | A1* | 5/2005 | Gelissen .......................... 725/47 |
| 2007/0104380 | A1* | 5/2007 | Gomila et al. ................. 382/239 |
| 2008/0068446 | A1 | 3/2008 | Barkley et al. |
| 2014/0016707 | A1 | 1/2014 | Wang |
| 2014/0112395 | A1* | 4/2014 | Lee et al. .................. 375/240.28 |
| 2015/0067186 | A1* | 3/2015 | Kuhn, Steven ............... 709/231 |

FOREIGN PATENT DOCUMENTS

| WO | WO9819460 A1 | 5/1998 |
| WO | WO2011087716 A2 | 7/2015 |

OTHER PUBLICATIONS

High Efficency Video Coding, last modified Apr. 6, 2014, Wikipedia.
Wenger et al., Codec Control Messages in the RTP Audio-Visual Profile with Feedback (AVPF), Feb. 2008, Network Working Group.
International Search Report and Written Opinion, from PCT/US2015/026314, Jul. 28, 2015, WO.

* cited by examiner

*Primary Examiner* — Melur Ramakrishnaiah
(74) *Attorney, Agent, or Firm* — Lempia Summerfield Katz LLC (57) ABSTRACT

In one embodiment, a decoder or transcoder of a video conference network receives the first video stream and an indication of the ratio of the spatial-to-temporal resolution of the tuning of the encoding. The behavior of the decoder or transcoder is set based on the indication of the ratio. The behavior is for use of the first video stream.

20 Claims, 3 Drawing Sheets

CONTENT MESSAGE FOR VIDEO CONFERENCING

TECHNICAL FIELD

This disclosure relates in general to the field of computer networks and, more particularly, to video conferencing with improved user experience.

BACKGROUND

In a real-time video conferencing, such as a telepresence video setup, a video encoder may tune encoding towards specific types of content. For example, the input may be either a live camera input or synthetic static data coming from a computer, such as a power point presentation. For the transmission of many video scenarios, there is a bit rate constraint. By tuning to the type of content, the video encoder chooses where to use the available bandwidth. By using a high resolution for synthetic data, a low number of frames per second is provided. A low number of frames per second is not desired for the live camera input. A low spatial resolution may allow a higher number of video frames per second, which might not be the best solution for static content. If the input is a presentation from a computer, high frame rate is most likely not so important, but high resolution is desired for a sharp, clear image. The decoder decodes and processes the video stream regardless of the type of content.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

Overview

A message is provided from an encoder with the encoded video stream. The message indicates the type of content that is encoded. The type of content from the message is used to process the video stream differently, such as relying on the relative priority of temporal verses spatial resolution in encoding to determine jitter or latency for receipt and/or how to handle missing packets of the video stream.

In one aspect, an encoder encodes a first video stream at an end-point of a video conference network. The encoding is tuned with a ratio of spatial-to-temporal resolution. A decoder or transcoder of the video conference network receives the first video stream and an indication of the ratio. A behavior of the decoder or transcoder is set based on the indication of the ratio of the spatial-to-temporal resolution of the tuning of the encoding. The behavior is for use of the first video stream.

In another aspect, logic encoded in one or more non-transitory computer-readable media includes code for execution. When executed by a processor, the code is operable to perform operations including receiving, at a video decoder, an encoded video stream with a message, the message indicating prioritization between frame rate and resolution of the encoded video stream; decoding the encoded video stream; and processing the decoded video stream differently as a function of the prioritization between the frame rate and the resolution.

In yet another aspect, a memory is configured to store a first setting for processing presentation video from an encoder and a second setting for processing camera video from the encoder. The first setting is different than the second setting. An interface is configured to receive a first video stream and a message from an encoder identifying a source of the first video stream as presentation or camera. A processor is configured to select the first or second setting as a function of the source and configured to process data of the first video stream using the selected first or second setting.

EXAMPLE EMBODIMENTS

The intention of a video encoder with respect to the number of frames per second and the choice of video resolution is not conveyed to the video decoder in the current video standards (H.264, HEVC/H.265). To communicate this information, the spatial and temporal tuning of the encoder may be transmitted with the H.264 or H.265 video stream through a supplemental enhancement information (SEI) message. A supplemental enhancement information (SEI) message may not require any other framework than the format of the message itself to be understood. Other messaging may be used.

The decoders may better understand the context of such a video stream. The receiving video decoder may choose to take different actions depending on the content. There are usages in a video decoder for the intent information, such as adjusting the size of jitter buffers or adjusting how to deal with corrupt video frames, as examples.

Figure 1:
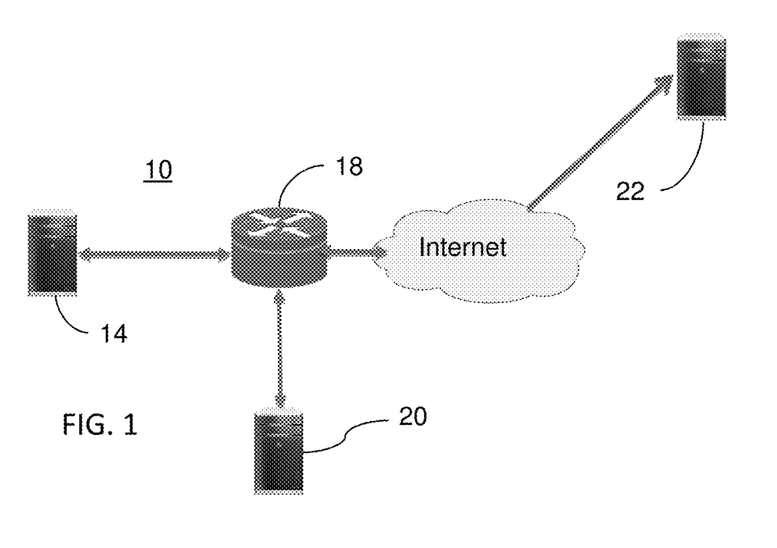
FIG. 1 is a simplified block diagram of an example network for assisting a decoder or transcoder based on encoded content.

FIG. 1 shows an example network 10 for video conferencing. A media session between end-point devices 14, 20 and 22 or peers is created. Any number of end-point devices 14, 20, and 22 may be used, such as just two. The video conference is hosted by the network 10 for providing audio, video, and/or synthetic content between the end-point devices 14, 20, and 22. The content is provided as a video stream. A transcoder 18 may combine decoded inputs from different end-point devices 14 and 20 for encoding a combined video stream, such as a picture-in-picture format. In one embodiment, the network 10 supports operation of a telepresence or web-ex system from Cisco, but other video conferencing may be provided.

Additional, different, or fewer components may be provided in the network 10. For example, additional or fewer end-point devices to participate in a given media session, additional third-party servers, or different networks. As another example, the transcoder 18 is not provided. In other examples, the network 10 may be many different devices connected in a local area network, wide area network, intranet, virtual local area network, the Internet, or combinations of networks. Any form of network may be provided, such as transport networks, data center, or other wired or wireless network. The network 10 may be applicable across platforms, extensible, and/or adaptive to specific platform and/or technology requirements.

The network devices (e.g., end-point devices 14 and 20) of the network 10 are in a same room, building, facility or campus, such as part of a same enterprise network. In other embodiments, the network 10 is formed with devices distributed throughout a region, such as in multiple states and/or countries. The end-point devices 14, 20, 22 may be in different networks.

The network devices are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

The transcoder 18 is a decoder and an encoder for receiving encoded inputs from the end-point devices 14 and 20, decoding the inputs, assembling video (e.g., combining input videos) and encoding the assembled video for output to any or all of the end-point devices 14, 20, and/or 22. In one embodiment, the transcoder 18 is an application specific integrated circuit, a computer, a conference server, or other hardware. Any now known or later developed transcoder may be used.

Any number of end-point devices 14, 20, 22 may be provided. The end-point devices 14, 20, 22 are computers, conference servers, tablets, cellular phones, wifi capable devices, laptops, mainframes, voice-over-Internet phones, or other user devices participating in a media session. The end-point devices 14, 20, 22 connect with wires, such as Ethernet cables, or wirelessly, such as with wifi. The connection may be relatively fixed, such as for personal computers connected by wires to switches. The connection may be temporary, such as associated with mobile devices.

The end-point devices 14, 20, 22 include encoders and/or decoders. The encoders and decoders are dedicated hardware, such as a computer card or an application specific integrated circuit. In other embodiments, the encoders and decoders are implemented by a general processor using software, such as a computer running conferencing software. Each end-point device 14, 20, 22 includes both encoding and decoding capabilities in one embodiment. When acting as a source of content, the end-point device 14, 20, 22 implements the encoding capability, such as encoding the content using H.264, H.265, or other compression. When acting as a destination of encoded video, the end-point device 14, 20, 22 implements the decoding capability, such as recovering the video content from the encoded video stream. The transcoder 18 similarly implements encoding and/or decoding for combining information from multiple sources.

The end-point devices 14, 20, 22 include one or more cameras, microphones, computers, memories and/or other sources of content. For example, one or more of the end-point devices 14, 20, 22 are telepresence systems with an array of cameras for real-time capture of people at particular positions, multiple displays for individually displaying video from the other end-points 14, 20, 22, one or more microphones, one or more speakers, and a conference table. As another example, the end-point device 14 is a personal computer or mobile device with a camera, microphone, and speaker.

The cameras provide sources of real-time video capturing a person, people, or other environmental information. The microphones capture real-time audio information. A processor, computer, server, memory, or other device creates and/or captures synthetic data at one or more end-point devices 14, 20, 22, such as a personal computer or conference server generating a POWER POINT or other presentation using software or a program or a computer downloading content from a server. The synthetic content may be captured in real-time, but may be more relatively static than a camera input, such as changing the displayed information once every minute or so. Alternatively, the synthetic content is captured only upon a trigger, such as a change in the display. Real-time capture by the camera and microphones captures any changes in the environment, so may have a relatively greater frequency, such as 20 Hz or more, than capture of synthetic data. Both types of content may be provided as inputs at a same or different frame rate.

At any given time, one or more of the end-point devices 14, 20, 22 are capturing and encoding input into a video stream. The same end-point devices 14, 20, 22 may also be decoding video from other end-point devices 14, 20, 22. Any given end-point device 14, 20, 22 may be only encoding, only decoding, or both encoding and decoding at a given time. The operation may change over time, such as one end-point device 14 capturing and encoding while the local user is speaking and then decoding while a user local to a different end-point device 20 is speaking. Similarly, the input source at a given end-point device 14, 20, 22 may change, such as switching between camera capture and receipt of synthetic data. Any conferencing arrangement or operation may be provided.

The end-point devices 14, 20, 22 are configured to initiate or participate in a media session. The end-point devices 14, 20, 22 operate pursuant to a real-time protocol (RTP) or other communications protocol for video and/or audio communications with or without data sharing. As part of the media session, content from another source may be added or incorporated. For example, data from one or more authorized sources, such as a financial services server, search engine, drop box database, or other source, is to be included in the media session, such as by the transcoder 18. The web content is requested pursuant to TCP/IP or other protocol.

The various components of the network 10 are configured by hardware and/or software to encode, decode, and/or process differently based on encoded content. Logic is provided in one or more non-transitory computer-readable media for operating the end-point device 14, end-point device 20, end-point device 22, and/or transcoder 18. The media is a memory. Memories within or outside the network 10 may be used. The logic includes code for execution by a processor or processors, such as processors of the end-point devices 14, 20, 22 or transcoder 18. When executed by a processor, the code is used to perform operations for operating differently depending on the content that was encoded. The receipt of a content message at a decoder is used for the different operations. The logic code configures the device to perform operations based on the message.

The end-point devices 14, 20, 22 and/or the transcoder 18 are configured to interact. The interaction provides a characterization of expected traffic (e.g., intent or encoder tuning information) on one or more connections for the media session between the end-point devices 14, 20, 22 and/or transcoder 18. This intent or encoder tuning information is used by a decoder, computer connected with or forming the decoder, and/or a device downstream of the decoder. The intent or tuning information is used to control operation of the decoder. Different operation is provided for different content where the content dictates the tuning of the encoder.

Figure 2:
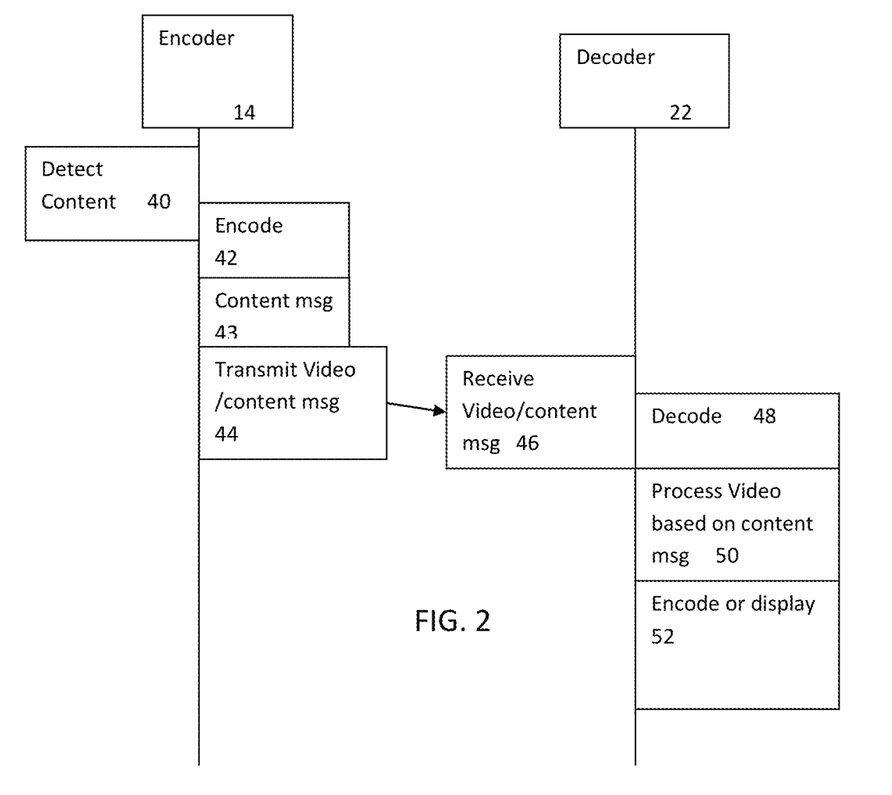
FIG. 2 is a diagram of one embodiment of a method for assisting a decoder or transcoder based on encoded content.

FIG. 2 shows a method for messaging content information and the use of the messaging of the content in a decoder. In the example of FIG. 2, the end-point device 14 is treated as the encoder and the end-point device 22 is treated as the decoder. In other embodiments, the encoding or decoding is by a different end-point device or the transcoder 18.

Various acts 40-52 are shown in FIG. 2. Additional, different, or fewer acts may be performed. For example, acts 40-44 are not performed, such as where the method is performed by the decoder 22. As another example, processed video content is used for a purpose other than display or encoding as part of transcoding in act 52. In yet another example, return messaging or additional acts are provided.

The acts are performed in the order shown, as represented vertically with the first acts occurring at the top of FIG. 2. In other embodiments, other orders are provided, such as encoding 42 and decoding 48 in an ongoing manner during a conference. FIG. 2 represents the order of acts for a particular frame or group of frames of video data, but an on-going operation is provided by repetition of the acts.

The acts are performed by the encoder and decoder, such as acts 40, 42, 43, and 44 being performed by the encoder 14 and acts 46, 48, 50, and 52 being performed by the decoder 22 (or transcoder). In other embodiments, connected or local components, such as a server, processor, or computer performs one or more of the acts. For example, the encoder 14 performs encoding in act 42, but a hosting computer uses an interface or port for transmitting in act 44 and/or itself detects the content in act 40. As another example, an interface of a computer or device receives the encoded video and message in act 46, the decoder 22 (either separate hardware or as software on a computer) decodes, and the local or same computer processes the decoded video in act 50.

In act 40, content to be encoded is detected. More than one input to the encoder 14 may exist, such as an input from a camera and another input for synthetic data. The inputs may be separate physical ports, separate sources of data, or both physical port and other source of data. For example, a computer connected with, housing, or hosting the encoder 14 generates a presentation, such as a power point presentation. The presentation is sourced by the processor or a memory. A physical input port of the computer receives video from a camera.

The type of content is detected. In one embodiment, the user selects between inputs using presentation software, an operating system capability, or other mechanism. The selection indicates the source of the content to be encoded. In another embodiment, the content is filtered or processed to identify the source. For example, a measure of change between each frame or a characteristic of change over time indicates the type of content, such as distinguishing between camera video and presentation video or distinguishing between temporal and spatial priorities.

The detection is performed by the encoder 14. Alternatively, another device performs the detection and communicates the results to the encoder.

The content may change over time. For example, a camera input is initially selected. At some point in the video conference, the user selects to add synthetic data or to replace the camera images with synthetic data. The detection is ongoing or may be triggered by a change in the input. Alternatively, periodic or user requested detection is performed.

In act 42, the received video is encoded. A sequence of frames of a given source or sources is received. For example, frames of images at any desired or available rate are received. The sequence provides a video stream. The rate of the video stream of one type of content may be the same or different than for another type of content.

The encoder 14 encodes the video stream. The encoder 14 at the source of the video or another location (e.g., network exit point or at a conferencing server) compresses the video to reduce bandwidth for transmission of the network and/or to another end-point. Any encoding may be used, such as High Efficiency Video Coding (HEVC) as provided by H.265 or MPEG (e.g., MPEG-4) as provided by H.264. Other encoding may be used. Lossy or lossless compression may be provided.

The encoding is tuned to the content. Given a limited or restricted bandwidth, the encoding may tune for greater spatial or greater temporal resolution. Greater temporal resolution may come at the cost of spatial resolution and vice versa. The restriction in bandwidth may be local (e.g., communication path from or processing ability of the end-point) or may be remote (e.g., restriction due to another end-point). The constraint on bit rate may be due to the end-point, a communications connection of the end-point, and/or the video conferencing network. The encoding may be set to provide a bit rate at or below a level. To achieve sufficient compression, temporal resolution, spatial resolution, and/or both may be set. The input video stream is compressed to meet the bit rate limitation based on the tuning. The encoding may be tuned for other reasons than limited or restricted bandwidth, such as to limit processing. The compression may use fewer then all frames for limiting temporal resolution or may use fewer than all pixels for limiting spatial resolution.

The amounts of spatial and temporal resolution reduction in encoding are tuned to the content. Any encoding operation may be altered due to the content. Real-time video or camera input may be appropriate for better temporal resolution, such as 20 frames per second or more. A certain spatial resolution may be desired. The spatial resolution may be less desired than temporal resolution. Any trade-off between the two may be used, such as a tradeoff set by the user. As a result, the camera video has a ratio of spatial-to-temporal resolution.

Synthetic data may be appropriate for better spatial resolution than temporal resolution. Since a presentation may not vary much between any two frames (e.g., may be relatively static), there is less need for temporal resolution. For a change between pages, any delay in showing the change may not matter as compared to delay in showing a person moving. Any trade-off between spatial and temporal resolution may be used for synthetic data.

The ratio is different depending on the type of content. Some synthetic data may use greater temporal resolution, such as a presentation that uses animation or embedded video. Some camera video may use greater spatial resolution, such as a security camera where details are more important than capturing at a high rate. Based on defaults or user settings for a given source of content at a given time, different ratios may be used by the encoder for compressing the video. For example, encoding for a computer-generated presentation has a different ratio of spatial-to-temporal resolution than encoding for real-time video. Synthetic data is encoded with a higher spatial resolution and lower temporal resolution than for a live camera input.

The ratio is a concept representing relative prioritization. The ratio may or may not be actually calculated as a value. The ratio may be a specific measure or may be an estimate or other indicator of the relative importance of spatial and temporal resolution. For example, the ratio may be one of two values (i.e., binary)—priority on spatial or priority on temporal. Any range of representations or step sizes for the ratio of temporal to spatial or spatial to temporal resolution may be used, such as 8 possible values where any ratio (weighting of priority) is mapped to a nearest value. The ratio may be indicated by a label of the type of content, such as live camera video label indicating a greater emphasis on temporal resolution.

In act 43, the encoder 14 generates a message indicating the content of the encoded video stream. The message has any format. For example, the message is included in a header or headers of packets for the encoded video stream. As another example, the message is included in the payload of a separate packet. The message may be part of communications for the encoded video stream or a separate message. In one embodiment, the message is included in the communications for the encoded video stream so that a same route or path is used.

The message is generated for a given video stream. Where the content of the video stream changes, a new message for the video stream may be generated. Alternatively, periodic or continuous messaging is used.

The message indicates the ratio. Any code for the ratio may be used, such as a binary code. Codes with a greater range or resolution of the ratio may be provided, such as a value of 0-63 or 0-127. Instead of a numerical value, a textual message, such as an identifier of the source of the content, is provided. Rather than a ratio value used by the encoder, the type of content is identified using a numerical and/or textual message. The tuning used by the encoder and/or the source of the content of the video are communicated in the message.

In act 44, the video stream and content message are transmitted. Using TCP/IP or other network communications (e.g., using RTP), the video stream and content message are communicated from one end-point to another, from a transcoder to an end-point, or from an end-point to a transcoder. In the example of FIG. 2, the encoder 14 transmits the encoded video stream and message to the decoder 22.

In act 46, the decoder 22 receives the encoded video stream and an indication of the ratio used to encode the source video. The decoder 22 receiving is at an end-point or part of a transcoder of the video conference network. The encoded video is received at a port or interface or from a memory (e.g., buffer).

The encoded video stream is an H.264 or H.265 encoded video stream, but other types of compression may be used. Packets carrying different parts of the encoded video stream are collected and organized for decoding.

The decoder 22 receives the message with an indication of the content. For example where HEVC is used for encoding, the message is a supplemental enhancement information (SEI) message generated by the encoder 14. The SEI message may be one of the user data unregistered SEI messages of the HEVC standard. Given a real-time video encoder, the intention of encoding choices with respect to a number of video frames per second and/or spatial resolution is signaled through the use of an H.264/H.265 SEI message. Other messages part of or not part of a standard for video encoding may be used.

The received message indicates the content of the video. The source or type of content is provided. The indication directly or indirectly indicates the source. For example, the message indicates the name or type of the source. As another example, the message indicates the tuning used due to the type of content. For example, motion and/or sharpness information is received in the H264 bit stream as a SEI message. Any tuning information, such as a tuning setting or tuning configuration may be communicated. In one embodiment, the message indicates a frame rate and/or spatial resolution of the encoded video stream.

In another embodiment, the message includes a value coded to different ratios or combinations of spatial and temporal resolutions used by the encoder. For example, a binary value is used to indicate priority for temporal or spatial resolution. As another example, a value with a range of three or more possible values is used. Any range may be provided, such as 0-62, 1-100, or 1-127. The value along this range represents the degree of motion, degree of spatial resolution, and/or the relative priority of spatial and temporal resolutions. For example, the intention to encode with respect to either live camera video on one hand and static presentation slides on the other hand is expressed through a number, for example, from 0 to 100. 0 may represent high degree of motion, so a high number of video frames per second is preferable at the sacrifice of spatial resolution for a given constraint on bit rate. 100 represents very static content where the focus is on high details, such as text, and where the video scene changes very seldom (e.g., no or little priority on temporal resolution). Different values may represent different combinations of spatial and temporal priority. By using a range of three or more values, the encoder 14 may convey spatial and temporal resolution trade-offs in between the extremes or more than two tuning configurations. For example, if the value is somewhere between 0 and 100, the input content used to encode is not necessarily fully static or fully camera input. This enables a decoder 22 to be less strict about decisions or allows more options for how to handle the decoded video. Having a larger range of values may convey more information.

Rather than indicating a strict range of ratios between temporal and spatial resolution, the value may indicate temporal and spatial characteristic groupings. For example, a value of 100 implies or represents that the number of frames per second from the encoder varies as the size in bits per frame might also vary due to the nature of video compression of relatively static content. The static content of a presentation occasionally varies by a large or little amount (e.g., changing a page in a presentation) while otherwise remaining static.

In act 48, the decoder 22 decodes the encoded video stream. Using decoding, the video stream input to the encoder is recovered, either lossy, or lossless. The compression is removed (decompressed) to generate the frames of video data representing the content. The synthetic data and/or camera data are recovered.

In act 50, the decoded video stream is processed differently depending on the indication or content. The decoded video stream is processed differently depending on the ratio, tuning, frame rate and/or spatial resolution, or other indication of the tuning or content that was encoded.

The processing may be in the creation of the frames during decoding (e.g., in the decompressing). The processing may be in the receipt and handling of the encoded frames. The processing may be how the decoded video is used or presented to the user. Other differences in processing may be provided. Combinations of differences in processing may be used.

Where the indication is binary, the differences are also binary. Where the indication provides a range of different ratios or tuning configurations, a similar range of differences in processing may be provided. In other embodiments, a 1-to-1 indication to differences in setting is not provided, such as two or more values in the range mapping to a same processing of the decoded video stream. The differences may be in one of magnitude (e.g., range of filter or buffer sizes) or may be a difference in approach (e.g., use in combination with other video or no combination with other video).

By setting the behavior of the decoder or transcoder based on the indication of the ratio of spatial-to-temporal resolution of the tuning in encoding, the decoder may provide an improved user experience for video conferencing. The video stream is processed differently so that the user receives the appropriate information in an appropriate way based on the content, as reflected by the tuning of the encoder. In this way, the decoder may prioritize higher quality images (e.g., only show complete decoded frames) or higher temporal resolution (e.g., replace missing information from other frames to maintain frame rate). Using the message, the decoder 22 may be better prepared for the incoming video bit stream and gives a better experience for the end viewer.

In one example approach for different processing by the encoder 22, the processing for handling missing information is different. One or more packets of the encoded video frames may not be received or may be corrupted. As a result, one or more, or parts of frames of the video may not be recovered. There are various options to handling this situation. In one option, the missing information is copied from another frame. The frame is recreated with a substitute for the missing information. In video from a camera, copying may go unnoticed due to the high frame rate. In a static display, such as a page of a presentation, copying may result in very different information being used in a page of the presentation. Another option is to discard the information. The incomplete frame is not used. This may go unnoticed or not matter for a presentation, but may cause jerkiness in a real-time camera.

The decoder 22 selects between replacing missing data in a frame and not using the frame. The packet loss behavior is set such that missing pixel values of the video stream are copied from a previous, subsequent or other frame where the ratio has a relatively high temporal resolution and not using a frame with missing pixel values where the ratio has a relatively low temporal resolution. The video decoder 22 uses information about the encoder's 14 view of the content to treat decoded frames in different manners. During packet loss of camera video, a good strategy for concealing missing video data is to copy missing pixel values from previous frames. However, in a presentation scenario, the previous frames might be from a completely different power point slide, and copying pixel values is very noticeable. A better concealment strategy in such a case is simply not to display corrupt video frames. The video will appear frozen for a small amount of time, but that is fine in a computer presentation case. In case of packet loss for synthetic data or presentation content, the screen is frozen until the decoder 22 is back in synchronization with the video. Intermediary approaches may be used, such as varying the number of sequentially corrupt frames that may be displaced with replacement data and/or the amount of time to allow a freeze or discarding frames.

In another example approach using different processing by the decoder 22 based on the content, a transcoder implementing the decoder has different settings. The transcoder may reduce frame rate and/or spatial resolution as part of combining video streams. The amount of spatial and/or temporal resolution reduction may depend on the indication of content. The indication in the message showing tuning, ratio, or other indication of content by the encoder 12 is used to determine behavior of the transcoder 18. For example, spatial resolution is maintained for static content (e.g., presentation) while temporal resolution is sacrificed, or temporal resolution is maintained while spatial resolution is sacrificed. Rather than maintaining, one type of resolution is deceased to a greater extent than the other type based on the content indicated in the message. In a transcoding scenario, the video bit stream is decoded and re-encoded. The transcoder 18 tunes its encoding to help preserve what the source encoder 14 targeted. The indication may be used by the transcoder 18 to avoid scaling, such as preferring low bits per frame with high frame rate for live camera video.

In another approach for using different processing by the decoder 22 based on the content, the decoder 22 selects different latency settings for the jitter buffer. The size of the jitter buffer determines the amount of time provided for assembling a frame for decoding or for display after decoding. The size of the jitter buffer is set differently depending on the ratio of spatial-to-temporal resolution indicated in the message from the encoder 14. The jitter buffer is relatively larger for presentation video and relatively smaller for camera video. For low latency camera video, it may be important to keep latency low. For presentations, higher latency is acceptable so a relatively larger jitter buffer may be used. Retransmission of lost packets may be utilized due to the larger jitter buffer.

Additional, different, or fewer differences in approaches may be used for decoder processing based on the content, ratio, tuning configuration, or other indication provided by the encoder. Any combination of approaches may be used.

In act 52, the processed video is used for display of the video. Alternatively, the processed video is combined with other video and re-encoded.

Figure 3:
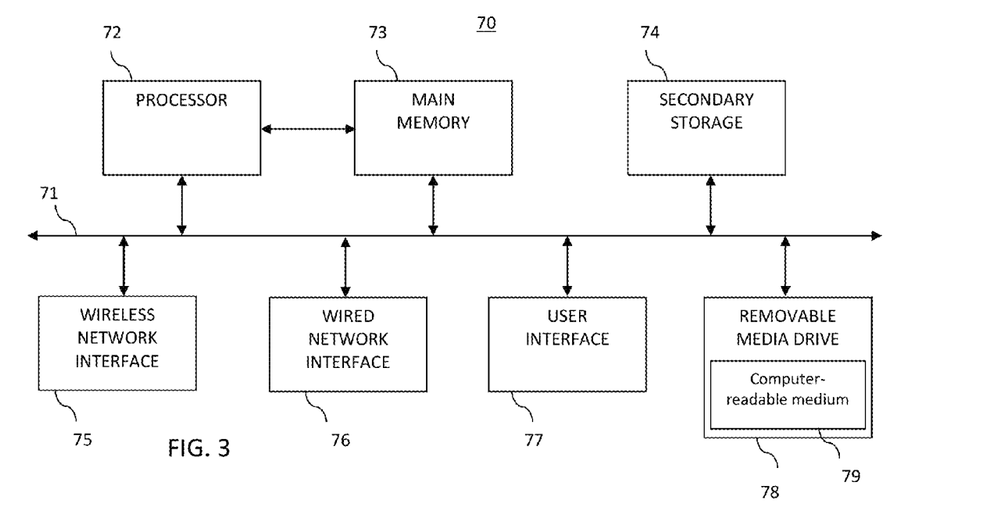
FIG. 3 is a block diagram of a network device, according to one embodiment, for decoding or transcoding based on encoded content.

FIG. 3 shows one embodiment of an apparatus for encoding and message generation and/or decoding with processing based on a content message from an encoder. The apparatus is shown as a simplified block diagram of an example network device, such as the end-point device 14, 20, 22, or transcoder 18 of FIG. 1. In FIG. 3, the example network apparatus or device 70 corresponds to network elements or computing devices that may be deployed in the video conferencing network 10. The network device 70 includes software and/or hardware to perform any one or more of the activities or operations for encoding, messaging, decoding, and/or processing decoding information as a function of an indication of content of the video stream.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices. For example, the network device 70 may include another processor and/or not include the secondary storage 74 or removable media drive 78. As another example, the network device 70 connects with a camera and microphone. Each network device may include more or less components than other network devices.

The network device 70 is a decoder or transcoder. The network device 70 may be a computer, server, or other network processor. In one embodiment, the network device 70 is a video conferencing server or user computer (e.g., personal computer, laptop, smart phone, tablet, or mobile device) with video conferencing capability or software. The network device 70 may be a computer with web browsing software where the web browser displays the conferencing information from a server.

In one embodiment, the network device 70 is a video conferencing system, such as a telepresence (from Cisco) or other video conference end-point or transcoder. Any device for decoding, including a device also capable of encoding, may use a message from the encoder for tuning processing on decoding. The encoder switches between or initially starts encoding one of multiple possible inputs, such as switching between a live camera video and a relatively static presentation (e.g., power point). The encoder sends a message indicating the input source of the video content, such as encoder settings used based on the type of input, a content label, or a value mapped to a characteristic of the content.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multi-processing, multitasking, parallel processing and the like.

The memory (e.g., external computer-readable media 79, in main memory 73, in the secondary storage 74, or in the cache memory of processor 72) also stores settings for processing video streams. Different settings are stored for different types of content. For example, at least two values are provided for a given parameter. The different values correspond to different content. Different values may be used for each of two or more parameters. The settings may additionally or alternatively be different instructions, different programs, or different software threads. The different configurations provided by the settings are stored in a look up table or other format. The different settings are for encoding and/or processing for decoding.

Different settings are provided for decoding processing camera video and presentation video. The processing for receiving encoded packets, for decoding, and/or for use of the decoded video is different depending on the source of the video. For example, different jitter buffer sizes or latency settings are provided. The amount of memory used to buffer packets for encoded and/or decoded frame assembly has different values depending on the encoding tuning. As another example, different packet loss settings are provided. The logic or instructions used to deal with unavailable (lost or corrupt) packets is different depending on the encoding tuning. For presentation video, a frame with missing information is discarded. For live camera video, missing data (e.g., pixel values) in one frame is replaced with data from another frame.

For encoding by the network device 70, the different settings are for encoding based on the content. Presentation and live camera video are encoded differently, such as with different spatial and temporal resolution settings. The stored settings include instructions for looking up or determining a bit rate and tuning the encoding based on the type of content and the bit rate.

The wireless and wired network interfaces 75 and 76 may be provided to enable electronic communication between the network device 70 and other network devices via one or more networks. In one example, the wireless network interface 75 includes a wireless network interface controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

The network interfaces 75 and/or 76 are configured to transmit an encoded video stream and a message about content or tuning of the encoding. Additionally or alternatively, the network interfaces 75 and/or 76 are configured to receive an encoded video stream and a message from an encoder. The message identifies a source of the video stream, such as identifying the source of a presentation or camera using a label, value, tuning information, or encoding information.

The processor 72, which may also be a central processing unit (CPU), is any general or special-purpose processor capable of executing machine readable instructions and performing operations on data as instructed by the machine readable instructions. The main memory 73 or other memory may be accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The processor 72 is configured by the instructions and/or hardware to encode and/or decode video. For encoding, the processor 72 is configured to generate a message indicating the content of the video. The input source is identified. The encoding is tuned based on the input source. By including the identification of the input source, settings for the tuning, and/or a value indicating the content or tuning in a message, the processor 72 may communicate the content to a decoder.

For decoding, the processor 72 is configured to receive the message and encoded video. Based on a known format of the message, the message is parsed to determine the content of the encoded video. The receipt of the encoded video, the decoding, the assembly of the decoded video, further handling of the decoded video, further encoding of the decoded video, and/or the presentation of the decoded video is performed differently for the different types of content. The processor 72 selects the settings (e.g., values and/or instructions) to use based on the content communicated in the message. The processor 72 is configured to process data of the video stream using the selected settings and not using settings for other types of content.

A user interface 77 may be provided in none, some or all devices to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for audio), camera, buttons, and/or touch pad. In other embodiments, only the display is provided.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
    encoding, by an encoder, a first video stream at an end-point of a video conference network, the encoding tuned with a ratio of spatial-to-temporal resolution;
    receiving, by a decoder or transcoder of the video conference network, the first video stream and an indication of the ratio; and
    setting behavior of the decoder or transcoder based on the indication of the ratio of the spatial-to-temporal resolution of the tuning of the encoding, the behavior being for use of the first video stream.

2. The method of claim 1 wherein encoding comprises encoding with a higher spatial resolution and lower temporal resolution for synthetic static data and a lower spatial resolution and higher temporal resolution for a live camera input.

3. The method of claim 1 wherein encoding comprises encoding with the ratio being different for a computer-generated presentation than for real-time video.

4. The method of claim 1 wherein encoding comprises encoding with the ratio being a function of a bit rate constraint for the end-point, for the video conference network, or for both.

5. The method of claim 1 wherein encoding comprises encoding using High Efficiency Video Coding.

6. The method of claim 1 wherein receiving the indication comprises receiving a message with the indication.

7. The method of claim 6 wherein receiving the message comprises receiving the message as a supplemental enhancement information message generated by the encoder.

8. The method of claim 7 wherein receiving the supplemental enhancement information message comprises receiving a user data unregistered supplemental enhancement message.

9. The method of claim 1 wherein receiving the indication comprises receiving a value along a range of values representative of degree of motion in the first video stream.

10. The method of claim 1 wherein setting the behavior comprises setting packet loss behavior such that missing pixel values of the first video stream are copied from a previous frame where the ratio has a relatively high temporal resolution and not using a frame with missing pixel values where the ratio has a relatively low temporal resolution.

11. The method of claim 1 wherein setting the behavior comprises setting an encoding behavior of the transcoder such that spatial resolution of the first video stream is maintained where the indication is of static content in the first video stream.

12. The method of claim 1 wherein setting the behavior comprises setting a jitter buffer size differently depending of the ratio.

13. The method of claim 12 wherein setting the jitter buffer size comprises setting the jitter buffer to be relatively smaller for camera video and setting the jitter buffer to be relatively larger for presentation video.

14. Logic encoded in one or more non-transitory computer-readable media that includes code for execution and when executed by a processor is operable to perform operations comprising:
    receiving, at a video decoder, an encoded video stream with a message, the message indicating a prioritization between frame rate and resolution of the encoded video stream and the encoded video stream comprising presentation data corresponding the resolution as the prioritization or camera video corresponding to the frame rate as the prioritization;
    decoding the encoded video stream;
    processing the decoded video stream differently as a function of the prioritization between the frame rate for the camera video and the resolution for the presentation data.

15. The logic of claim 14 wherein the encoded video stream comprises an H.264 or H.265 encoded video stream, and wherein receiving the message comprises receiving a supplemental enhancement information message.

16. The logic of claim 14 wherein processing comprises selecting between replacing missing data in a frame and not using the frame.

17. The logic of claim 14 wherein processing comprises selecting a different latency for a jitter buffer.

18. An arrangement comprising:
    a memory configured to store a first setting for processing presentation video from an encoder and a second setting for processing camera video from the encoder, the first setting different than the second setting;
    an interface configured to receive a first video stream and a message from an encoder identifying a source of the first video stream as presentation or camera; and
    a processor configured to select the first or second setting as a function of the source and configured to process data of the first video stream using the selected first or second setting.

19. The arrangement of claim 18 wherein the first and second settings comprise first and second jitter buffer sizes, the jitter buffer size being larger for the presentation source than for the camera source.

20. The arrangement of claim 18 wherein the first and second settings comprise first and second packet loss settings, respectively, the first packet loss setting comprising discarding a frame associated with packet loss, and the second packet loss setting comprising copy missing data for the frame from a previous frame.

* * * * *